Stone & Chamberlin
Jaw Trap

Nº 83,220.    Patented Oct. 20, 1868.

Witnesses  
Stillman Haynes  
John O. Foley

Inventor.  
James S. Stone  
George W. Chamberlin

JAMES S. STONE AND GEORGE W. CHAMBERLIN, OF FITCHBURG, MASSACHUSETTS.

Letters Patent No. 83,220, dated October 20, 1868.

BIRD-TRAP.

The Schedule referred to in these Letters Patent and making part of the same.

*To all whom it may concern:*

Be it known that we, JAMES S. STONE and GEORGE W. CHAMBERLIN, of Fitchburg, in the county of Worcester, State of Massachusetts, have invented certain new and useful Improvements in Bird-Traps; and we do hereby declare the following to be a full, clear, and exact description of the same, due reference being had to the accompanying drawings, and the letters of reference marked thereon.

The object of our invention is to make a portable trap that shall catch the birds alive, and that may be readily secured in any position or place.

To these ends, its nature consists in arranging a case, with spring, noose, and tripping-mechanism connected therewith, and providing the case with some ready means whereby it may be quickly and easily placed secure from being carried away by the entrapped bird.

Figure 1:
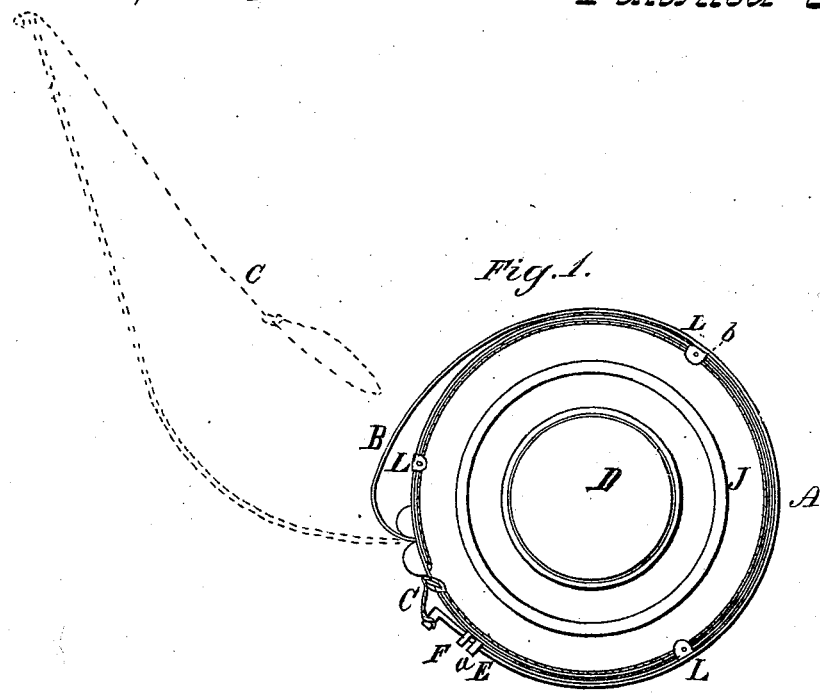

Figure 1, of the drawings, shows the trap set, the dotted lines showing the spring and noose when sprung.

Figure 2:
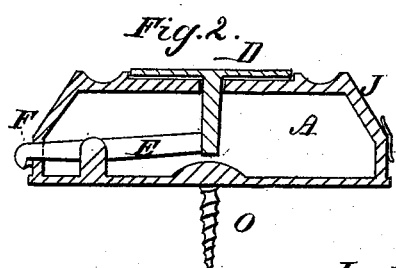

Figure 2 is a section through the line *a b*.

The same letters indicate the same parts in both.

A is the case.

B, the spring.

C, the noose.

D, the table, or tilting-plate, connected to the catch-lever E in such a manner as to raise or release its outer end from holding the spring when the table is depressed.

F is a guard, to prevent the spring from rising with the catch.

On the case A we make a bevelled surface, J, over which the noose is spread, and at L L L are slips to hold the noose tightly, to prevent its being blown out of place.

The use of the bevel J is to throw up the noose when drawn by the spring from the case, so that it shall fly up over the table D and on to the legs of the bird, above the feet, to make sure of it. It may be varied in different traps, as found best, and perhaps in some a rounded surface may be best.

To the bottom of the case A we secure a screw, O, by which the trap may be readily secured to a post, or limb, or other convenient place.

There is a trough, for seed or bait, which may be also put on the table.

The operation of it is as follows: The trap being secured in the place selected, the spring is bent round the case, and under the guard F, and the catch E is pressed down to hold it. This raises the table D. The noose is spread around J, and under the slips L L L. The bird, lighting on the table D, depresses it, releasing the spring, which immediately draws the noose, causing it to fly up on to the legs of the bird, where it is drawn tight.

What we claim as new, and desire to secure by Letters Patent, is—

1. The combination of the case, and its catch-mechanism, with the spring B and noose C, the whole constructed and operating in the manner and for the purposes above set forth and described.

2. The bevelled surface J, for the purpose of throwing up the noose C, substantially as set forth.

JAMES S. STONE.
GEORGE W. CHAMBERLIN.

Witnesses:
STILLMAN HAYNES,
JOHN O. FOLEY.